United States Patent
Cargnoni et al.

(10) Patent No.: US 8,521,982 B2
(45) Date of Patent: Aug. 27, 2013

(54) LOAD REQUEST SCHEDULING IN A CACHE HIERARCHY

(75) Inventors: Robert A. Cargnoni, Austin, TX (US); Guy L. Guthrie, Austin, TX (US); Thomas L. Jeremiah, Research Triangle Park, NC (US); Stephen J. Powell, Austin, TX (US); William J. Starke, Austin, TX (US); Jeffrey A. Steucheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 12/424,207

(22) Filed: Apr. 15, 2009

(65) Prior Publication Data

US 2010/0268882 A1 Oct. 21, 2010

(51) Int. Cl.
G06F 12/00 (2006.01)
(52) U.S. Cl.
USPC ........... 711/169; 711/150; 711/168; 711/122; 712/216; 712/217; 712/218; 712/219
(58) Field of Classification Search
None
See application file for complete search history.

(56) References Cited

U.S. PATENT DOCUMENTS

| | | | |
|---|---|---|---|
| 7,284,102 B2 | 10/2007 | Guthrie et al. | |
| 2003/0005229 A1* | 1/2003 | Rangan | 711/122 |
| 2004/0111594 A1 | 6/2004 | Feiste et al. | |
| 2006/0129764 A1 | 6/2006 | Bellows et al. | |
| 2007/0283100 A1* | 12/2007 | Asano et al. | 711/125 |

* cited by examiner

Primary Examiner — Charles Rones
Assistant Examiner — Baboucarr Faal
(74) Attorney, Agent, or Firm — Yudell Isisdore Ng Russell PLLC

(57) ABSTRACT

A system and method for tracking core load requests and providing arbitration and ordering of requests. When a core interface unit (CIU) receives a load operation from the processor core, a new entry in allocated in a queue of the CIU. In response to allocating the new entry in the queue, the CIU detects contention between the load request and another memory access request. In response to detecting contention, the load request may be suspended until the contention is resolved. Received load requests may be stored in the queue and tracked using a least recently used (LRU) mechanism. The load request may then be processed when the load request resides in a least recently used entry in the load request queue. CIU may also suspend issuing an instruction unless a read claim (RC) machine is available. In another embodiment, CIU may issue stored load requests in a specific priority order.

8 Claims, 7 Drawing Sheets

LOAD REQUEST SCHEDULING IN A CACHE HIERARCHY

This invention was made with United State Government support under Agreement No. HR0011-07-9-002, awarded by DARPA. THE GOVERNMENT HAS CERTAIN RIGHTS IN THE INVENTION.

BACKGROUND OF THE INVENTION

1. Technical Field

The present invention relates generally to data processing systems and specifically to load requests of a processor core. Still more particularly, the present invention relates to an improved system and method of handling core load requests in a cache hierarchy.

2. Description of the Related Art

Increasing efficiency of data operation at the processor-cache level is an important aspect of processor chip development. Modern microprocessors typically include entire storage hierarchies (caches) integrated into a single integrated circuit. For example, one or more processor cores containing L1 instruction and/or data caches are often combined with a shared on-chip L2 cache. A conventional symmetric multi-processor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from memory. In some multiprocessor (MP) systems, the cache hierarchy includes at least two levels. The level one (L1), or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then access lower-level caches (e.g., level two (L2) or level three (L3) caches) for the requested memory block. The lowest level cache (e.g., L3) is often shared among several processor cores.

For a typical processor core that has an associated store-in L2 cache, a sensitive performance balance exists between the scheduling of core load requests and core store requests. For optimal performance, access latency should remain at a minimum for core loads. However, many false attempts to dispatch a load request may exist, due to resource conflicts in the L2 cache. These resource conflicts may include: address collisions, load-hit-store queue collision, and machine full collisions.

Load requests have higher priority over store dispatch requests because the requested data of a load request is critical for processing in the core. Store request operations are less critical because store requests only update the memory hierarchy with computational results. In convention systems, however, lookup bandwidth and internal datapaths may be substantially consumed by issued requests that cannot yet be dispatched leading to decreased processing efficiency.

SUMMARY OF THE INVENTION

Disclosed is a system and method for tracking core load requests from a processor core in a cache hierarchy and providing arbitration and ordering of requests, as needed, for more efficient processing by the processor core. When a core interface unit (CIU) receives a load operation from the processor core, a new entry is allocated in a queue of a plurality of queues of the CIU. In response to allocating the new entry in the queue, the CIU detects contention between the load request and another memory access request in the processing unit. In response to detecting contention, the load request may be suspended until the contention is resolved. The received load request may be stored in the queue and tracked using a least recently used (LRU) mechanism. The load request may then be processed when the load request resides in a least recently used entry among the plurality of entries in the load request queue. CIU may also suspend issuing an instruction unless a read claim (RC) machine is available (or becomes available), or when the CIU load request must wait on the completion of a previous store to the same address that has yet to be processed by an RC machine. In another embodiment, CIU may issue load requests stored in the plurality of queues in a specific priority order, dependent on the type of request stored in each of the queues.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
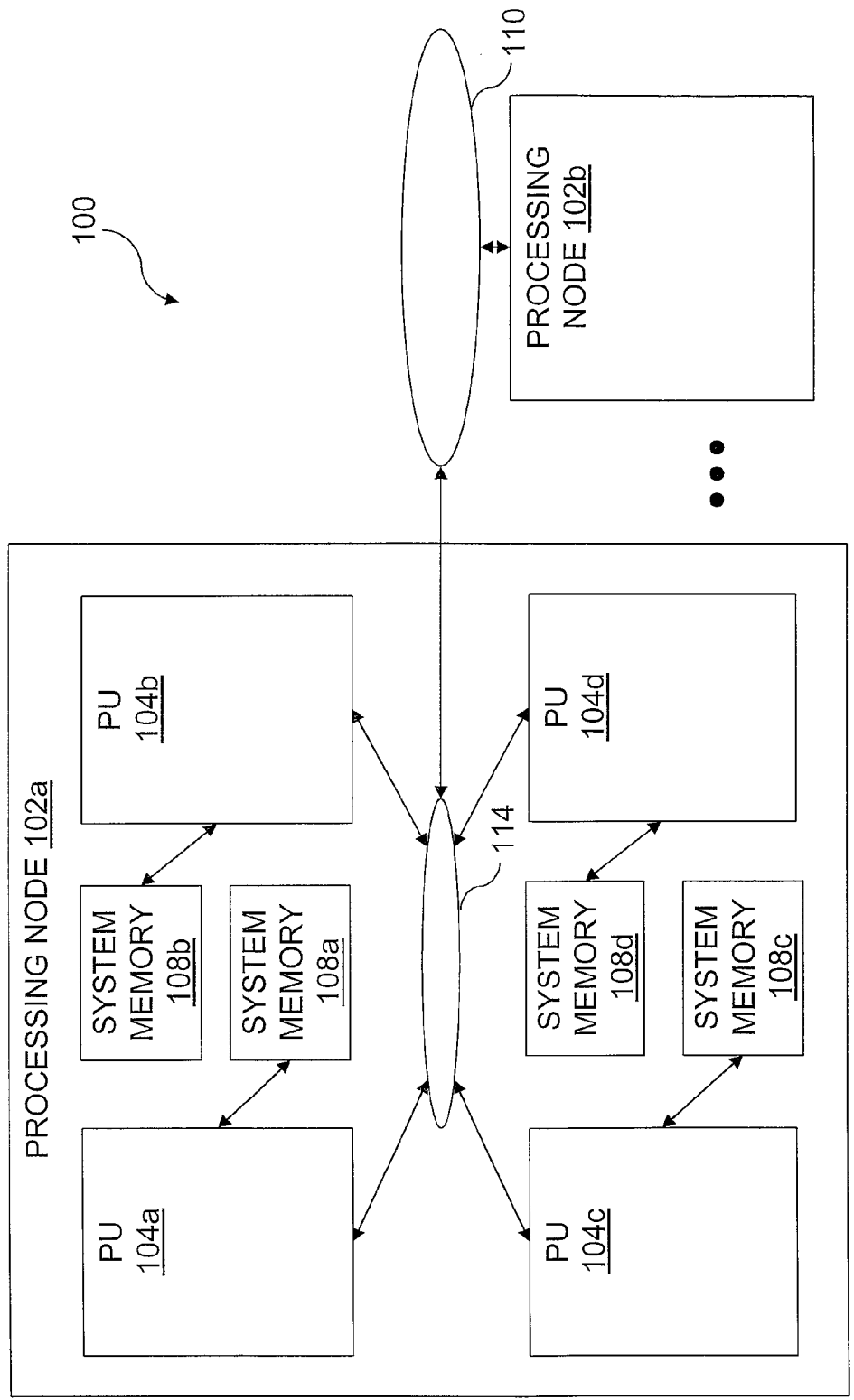
FIG. 1 is a high-level block diagram of an exemplary data processing system, in accordance with one embodiment of the present invention.

With reference now to the figures, wherein like reference numerals refer to like and corresponding parts throughout, and in particular with reference to FIG. 1, there is illustrated a high-level block diagram depicting an exemplary data processing system in which the present invention may be implemented. The data processing system is depicted as a cache coherent symmetric multiprocessor (SMP) data processing system 100. As shown, data processing system 100 includes multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches or as a hybrid interconnect.

As described below in greater detail with reference to FIG. 2, processing units 104 each include a memory controller 106 coupled to local interconnect 114 to provide an interface to a respective system memory 108. Data and instructions residing in system memories 108 can generally be accessed and modified by a processor core in any processing unit 104 of any processing node 102 within data processing system 100. In alternative embodiments of the invention, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
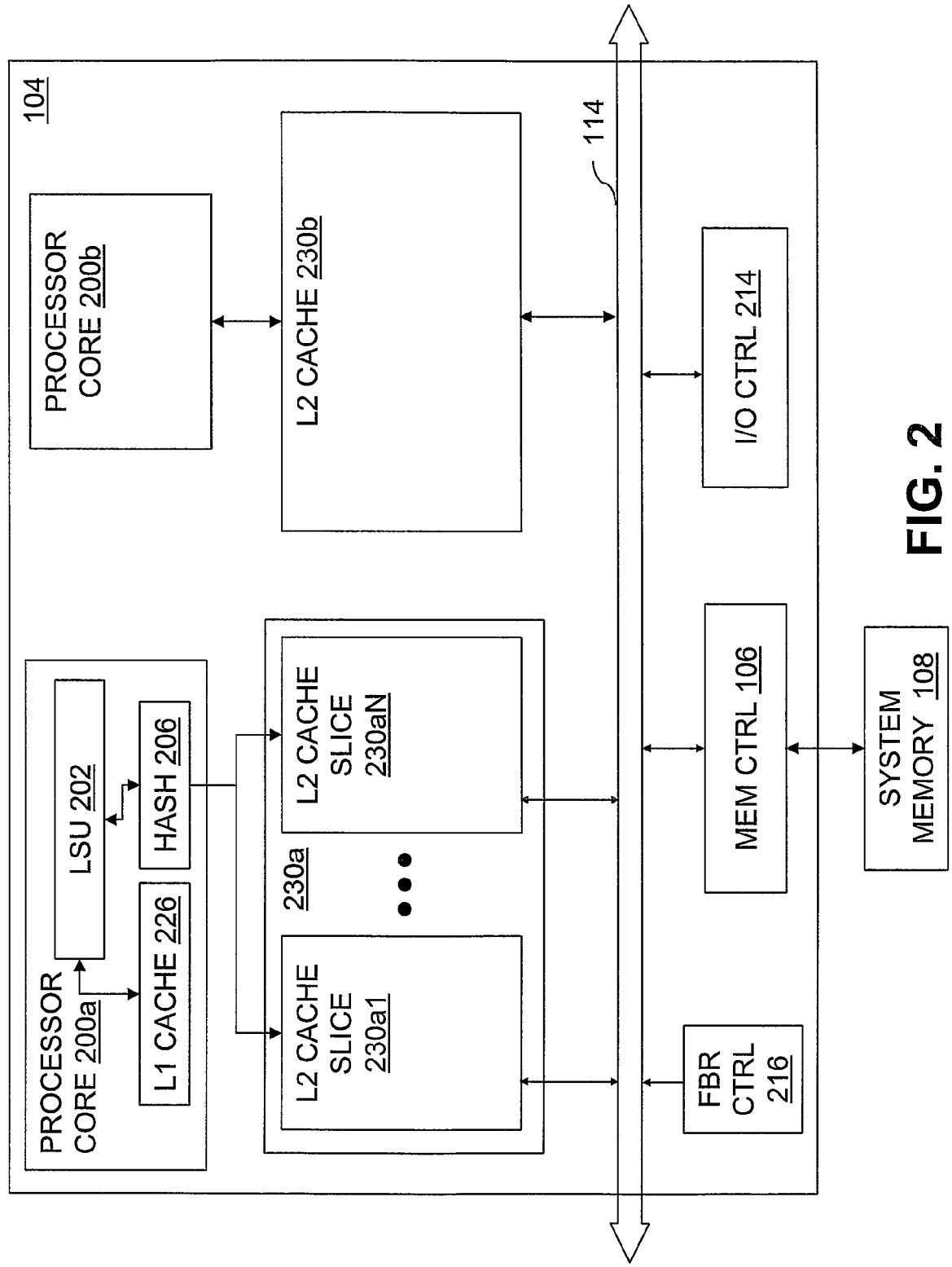
FIG. 2 is a more detailed block diagram of an exemplary processing unit, in accordance with one embodiment of the present invention.

Referring now to FIG. 2, there is depicted a more detailed block diagram of an exemplary processing unit 104 in accordance with the present invention. In the depicted embodiment, each processing unit 104 is an integrated circuit including two processor cores 200a, 200b for processing instructions and data. In a preferred embodiment, each processor core 200 is capable of independently executing multiple hardware threads of execution simultaneously. As depicted, each processor core 200 includes one or more execution units, such as load-store unit (LSU) 202, for executing instructions. The instructions executed by LSU 202 include memory access instructions that request access to a memory block or cause the generation of a request for access to a memory block.

The operation of each processor core 200 is supported by a multi-level volatile memory hierarchy having at its lowest level a shared system memory 108 accessed via an integrated memory controller 106, and at its upper levels one or more levels of cache memory, which in the illustrative embodiment include a store-through level one (L1) cache 226 within and private to each processor core 200, and a respective store-in level two (L2) cache 230 for each processor core 200a, 200b. In order to efficiently handle multiple concurrent memory access requests to cacheable addresses, each L2 cache 230 is implemented with multiple L2 cache slices 230x1-230xN, each of which handles memory access requests for a respective set of real memory addresses.

Although the illustrated cache hierarchies includes only two levels of cache, those skilled in the art will appreciate that alternative embodiments may include additional levels (L3, L4, etc.) of on-chip or off-chip in-line, lookaside or victim cache, which may be fully inclusive, partially inclusive, or non-inclusive of the contents the upper levels of cache.

Each processing unit 104 further includes an integrated and distributed fabric controller 216 responsible for controlling the flow of operations on local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

In operation, when a hardware thread under execution by a processor core 200 includes a memory access instruction requesting a specified memory access operation to be performed, LSU 202 executes the memory access instruction to determine the target real address of the memory access request. LSU 202 then transmits to hash logic 206 within its processor core 200 at least the memory access request, which includes at least a transaction type (ttype) and a target real address. Hash logic 206 hashes the target real address to identify the appropriate destination (e.g., L2 cache slice 230a1-230aN) and dispatches the request for servicing to the appropriate destination.

Figure 3:
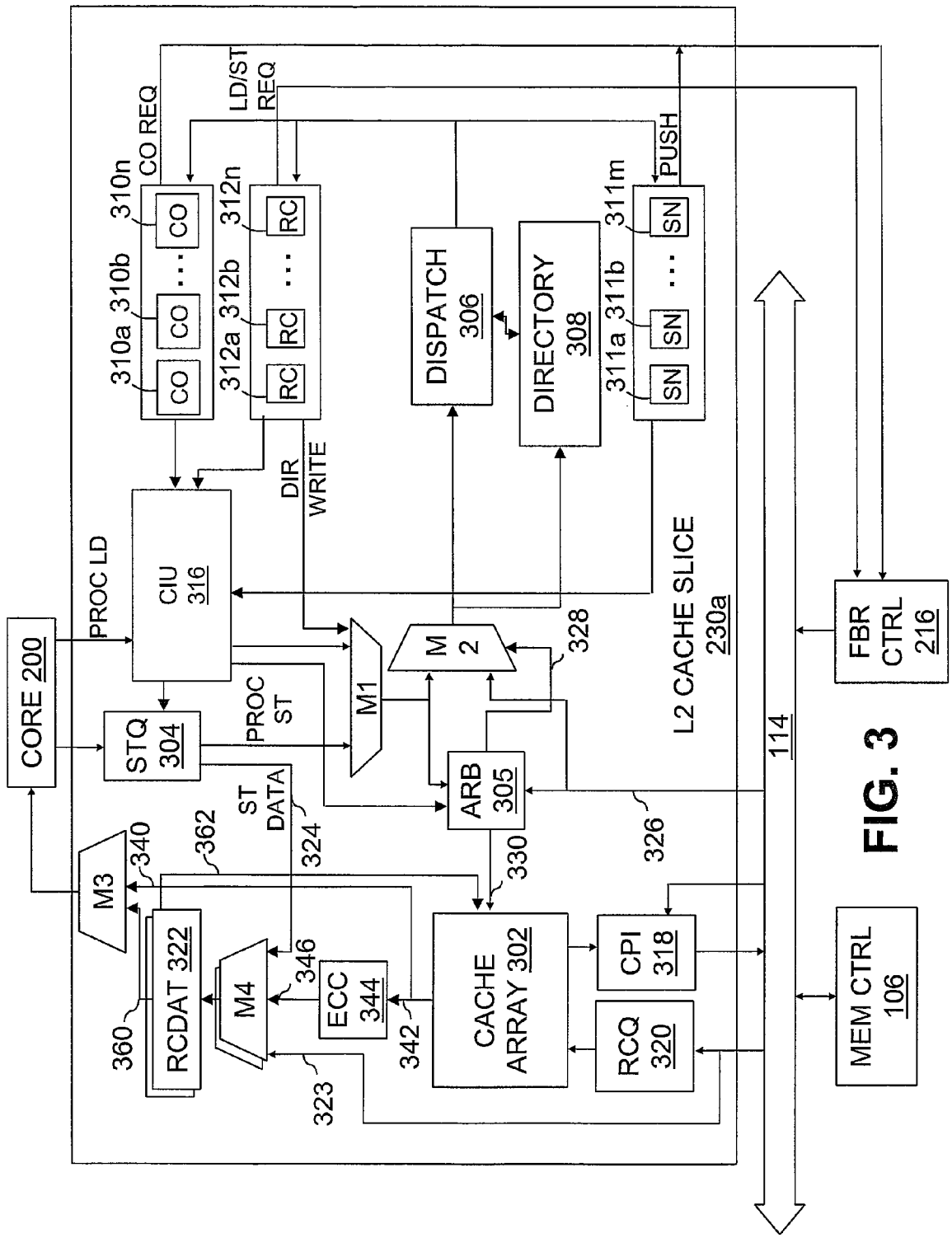
FIG. 3 is a more detailed block diagram of an L2 cache slice, in accordance with one embodiment of the present invention.

With reference now to FIG. 3, there is illustrated a more detailed block diagram of an exemplary embodiment of one of L2 cache slice 230a1-230aN (referred to generically as L2 cache slice 230a) in accordance with the present invention. As shown in FIG. 3, L2 cache slice 230a includes a cache array 302 and a directory 308 of the contents of cache array 302.

Assuming cache array 302 and directory 308 are set associative as is conventional, memory locations in system memories 108 are mapped to particular congruence classes within cache array 302 utilizing predetermined index bits within the system memory (real) addresses. The particular memory blocks stored within the cache lines of cache array 302 are recorded in cache directory 308, which contains one directory entry for each cache line. While not expressly depicted in FIG. 3, it will be understood by those skilled in the art that each directory entry in cache directory 308 includes various fields, for example, a tag field that identifies the real address of the memory block held in the corresponding cache line of cache array 302, a state field that indicate the coherency state of the cache line, and a LRU (Least Recently Used) field indicating a replacement order for the cache line with respect to other cache lines in the same congruence class.

L2 cache slice 230a includes multiple (e.g., 16) Read-Claim (RC) machines 312a-312n for independently and concurrently servicing load (LD) and store (ST) requests received from the affiliated processor core 200. In order to service remote memory access requests originating from processor cores 200 other than the affiliated processor core 200, L2 cache slice 230a includes multiple snoop machines 311a-311m. Each snoop machine 311 can independently and concurrently handle a remote memory access request "snooped" from local interconnect 114. As will be appreciated, the servicing of memory access requests by RC machines 312 may require the replacement or invalidation of memory blocks within cache array 302. Accordingly, L2 cache slice 230a includes CO (castout) machines 310 that manage the removal and writeback of memory blocks from cache array 302.

Figure 4:
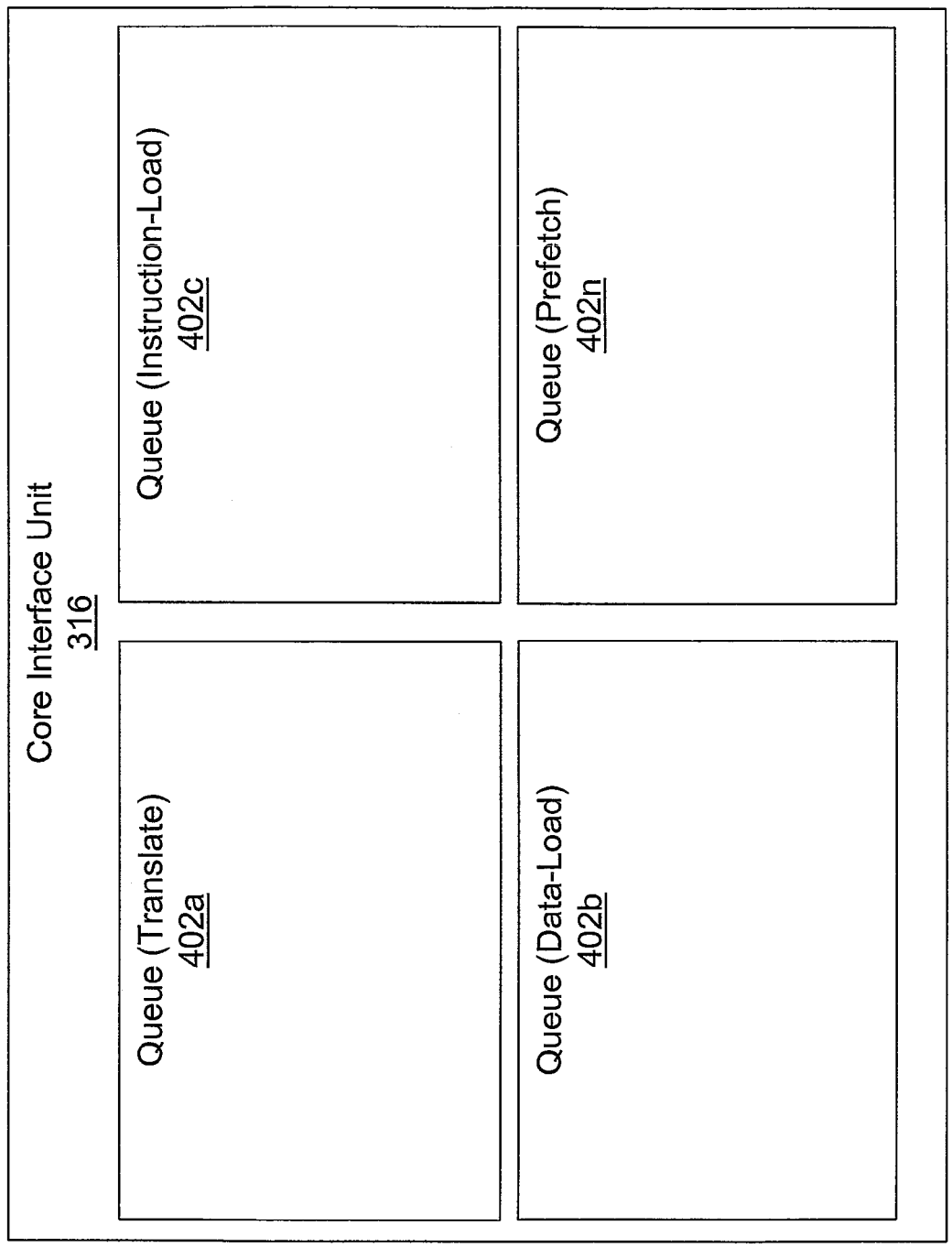
FIG. 4 is a more detailed block diagram of a core interface unit, in accordance with one embodiment of the present invention.

L2 cache slice 230a further includes a core Interface Unit (CIU) 316 that buffers load-type requests, such as data load requests, translation fetch requests, instruction load requests, and prefetch requests, received from processor core 200. As indicated in FIG. 4, CIU 316 preferably includes a separate queue for each specific kind of load-type request. For example, FIG. 4 illustrates a translation fetch queue 402a for buffering translation fetch requests, a data load queue 402b for buffering data load requests, an instruction load queue 402c for buffering instruction load requests, and a prefetch queue 402d for buffering prefetch requests.

L2 cache slice 230a further includes an arbiter 305 that controls multiplexers M1-M2 to order the processing of local memory access requests received from affiliated processor core 200 and remote requests snooped on local interconnect 114. Memory access requests, including local load and store operations and remote read and write operations, are forwarded in accordance with the arbitration policy implemented by arbiter 305 to a dispatch pipeline 306 where each read/load and store request is processed with respect to directory 308 and cache array 302 over a given number of cycles.

L2 cache slice 230a also includes an RC queue 320 and a CPI (castout push intervention) queue 318 that respectively buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 311, such that each CO machine 310 and each snooper 311 that is dispatched retrieves data from only the respective designated CPI buffer entry.

Each RC machine 312 also has assigned to it a respective one of multiple RC data (RCDAT) buffers 322 for buffering a memory block read from cache array 302 and/or received from local interconnect 114 via reload bus 323. RCDAT buffers 322 have an associated store data multiplexer M4 that selects data bytes from among its inputs for buffering in the RCDAT buffer 322 in response unillustrated select signals generated by arbiter 305.

In operation, processor store requests comprising a transaction type (ttype), target real address and store data are received from the affiliated processor core 200 within a store queue (STQ) 304. From STQ 304, the store data are transmitted to store data multiplexer M4 via data path 324, and the store type and target address are passed to multiplexer M1. Multiplexer M1 also receives as inputs processor load requests from CIU 316 and directory write requests from RC machines 312. In response to unillustrated select signals generated by arbiter 305, multiplexer M1 selects one of its input requests to forward to multiplexer M2, which additionally receives as an input a remote request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local request received from multiplexer M1 or the remote request snooped from local interconnect 114 as the next memory access request to be processed.

Figure 5:
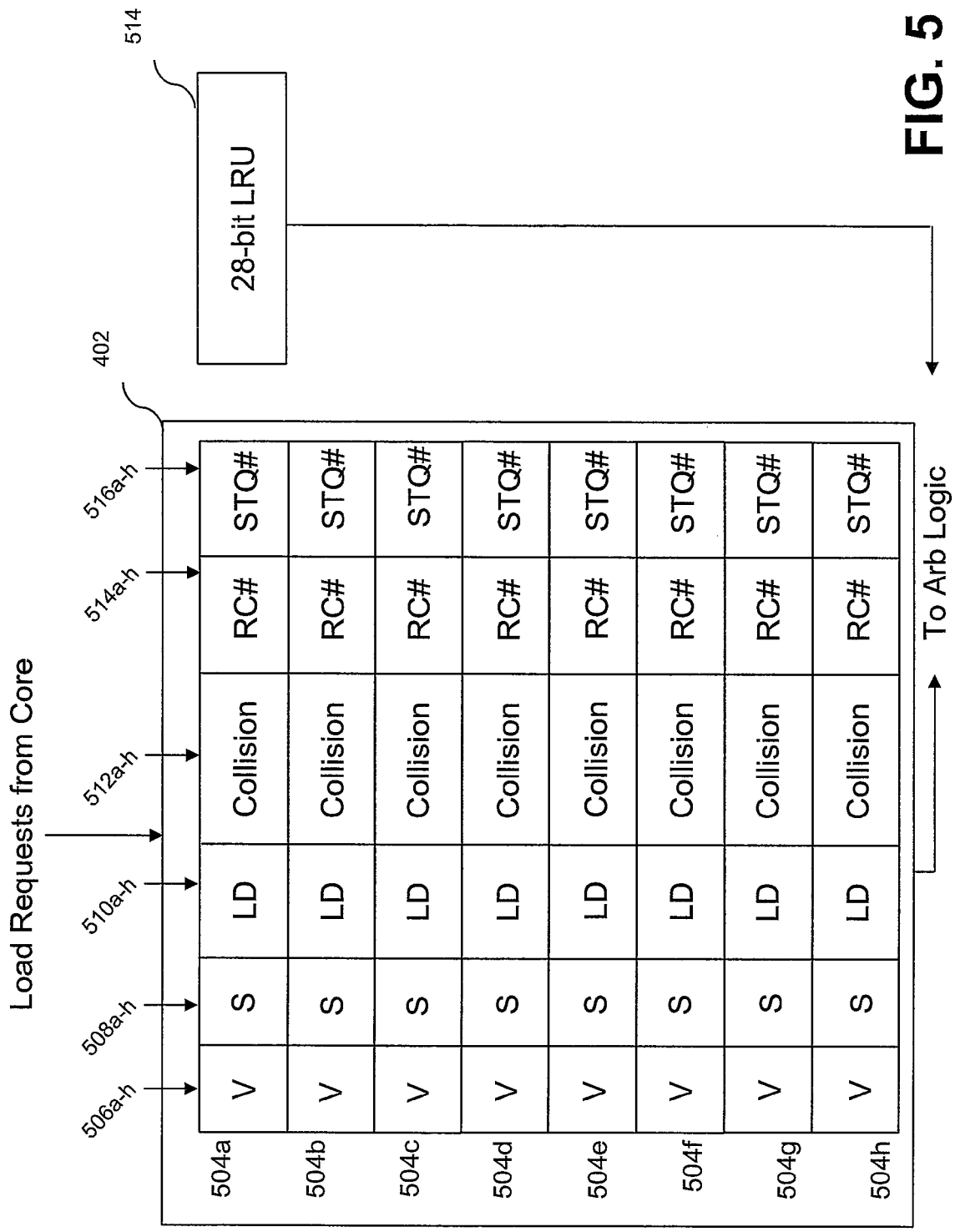
FIG. 5 is a more detailed block diagram of a queue of a core interface unit, in accordance with one embodiment of the present invention.

Referring now to FIG. 5, there is a more detailed block diagram of a queue 402 of CIU 316, in accordance with one embodiment of the present invention. The illustrated queue structure can be utilized to implement any of queues 402a-402d of FIG. 4.

In the depicted embodiment, queue 402 includes eight entries 504a-504h for buffering load-type requests received from the affiliated processor core 202, where each entry 504a-504h comprises a valid bit 506a-h, a suspend bit 508a-h, a request field 510a-h, a collision type field 512a-h, a read claim (RC) field 514a-h, and a store queue (STQ) field 516a-h. A valid bit 506, when set, indicates that the corresponding request field 510 contains a valid request. A suspend bit 508, when set, indicates that issuance of the corresponding request from queue 402 is temporarily suspended. Collision type 512a-h indicates the specific type of collision encountered (when applicable). The collision may be a read claim (RC) address collision, a store queue (STQ) collision, or a resource contention collision. Additionally, the resource contention collision may also include an address collision. RC number 514a-h is a value assigned to the load request 510a-h corresponding to a specific contention condition such as RC full, CO full, SN full, or null (in the event of no detected contention). The STQ number 516a-h is a value assigned to the load request 510a-h corresponding to a specific contention condition such as a load-hit-store collision. In the case of a load-hit-store collision, the RC number 514a-h to track the load-hit-store contention once the store is dispatched into an RC machine.

Still referring to FIG. 5, each queue 402 further includes a 28-bit LRU mechanism 514 that maintains a precise record of the relative ordering of the load-type requests buffered in entries 504a-504h. As described further below with reference to FIG. 6B, requests ready for issuance from a queue 402 are preferably ordered for presentation in accordance with the ordering indicated by LRU mechanism 514.

Figure 6A:
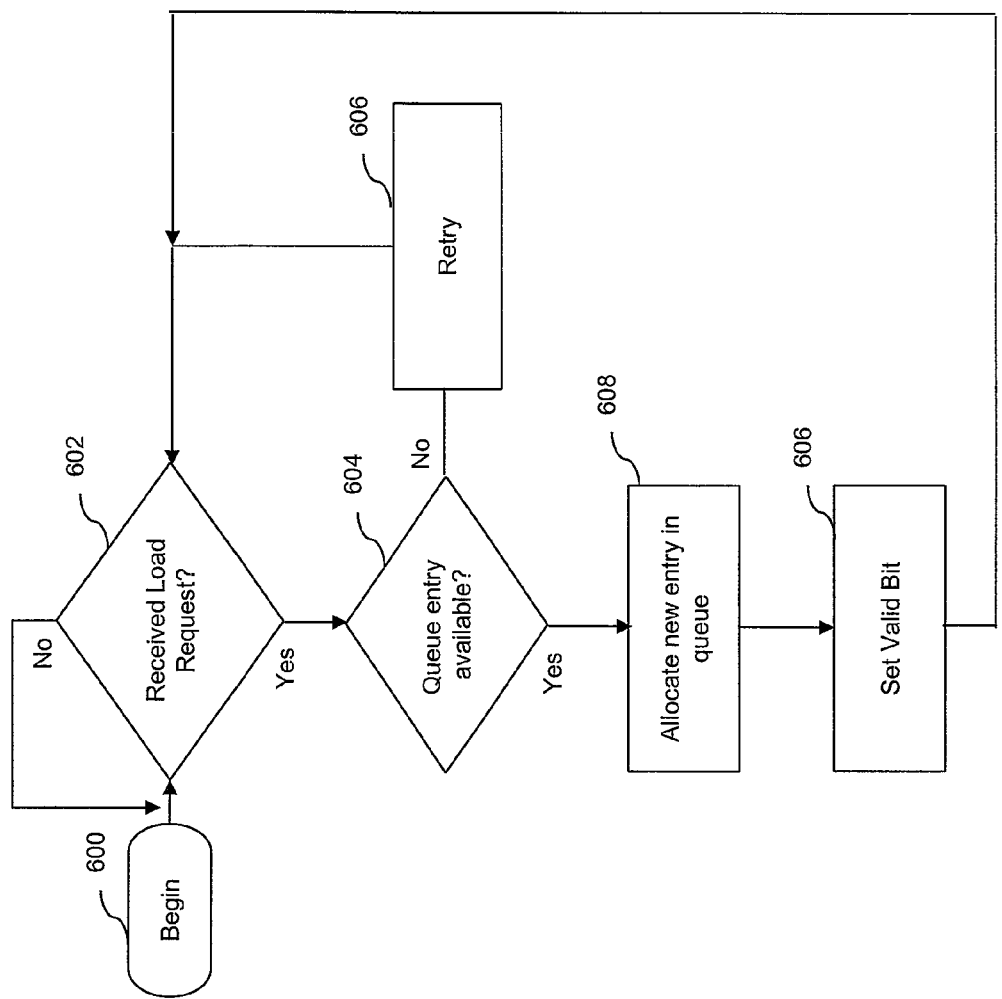
FIG. 6A is a high level logical flowchart of an exemplary process for allocating a new entry of a load request in a queue, in accordance with one embodiment of the present invention.

Referring now to FIG. 6A, there is depicted a high level logical flowchart of an exemplary process for enqueuing a core load-type request in an entry 504 of a queue 402 in CIU 316, in accordance with one embodiment. As depicted, the process begins at block 600 and then proceeds to block 602, which illustrates CIU 316 determining whether or not a load-type request of the processor core 200 has been received. If not, the process iterates at block 602 until a load-type request has been received. In response to a determination at block 602 that a load-type request has been received, CIU 316 determines at block 604 whether an entry 504 is available for allocation of the received load-type request in the queue 402a-402d corresponding to the request type. If core interface unit 316 determines at block 604 that a queue entry is not available for allocation to the received load-type request, CIU 316 will retry the request (block 606). Thereafter, the process returns to block 602. In response to determining at block 604 that a queue entry is available in the appropriate one of queues 402a-402d, CIU 316 allocates an entry 504 to the request in the appropriate one of queue 402a-402d and fills request field 510 of the allocated entry 504 (block 608). Block 610 depicts the CIU 316 setting the valid bit 506 of the allocated entry 504, indicating that a valid load-type request is contained in the entry 504. Thereafter, the process returns to block 602.

Figure 6B:
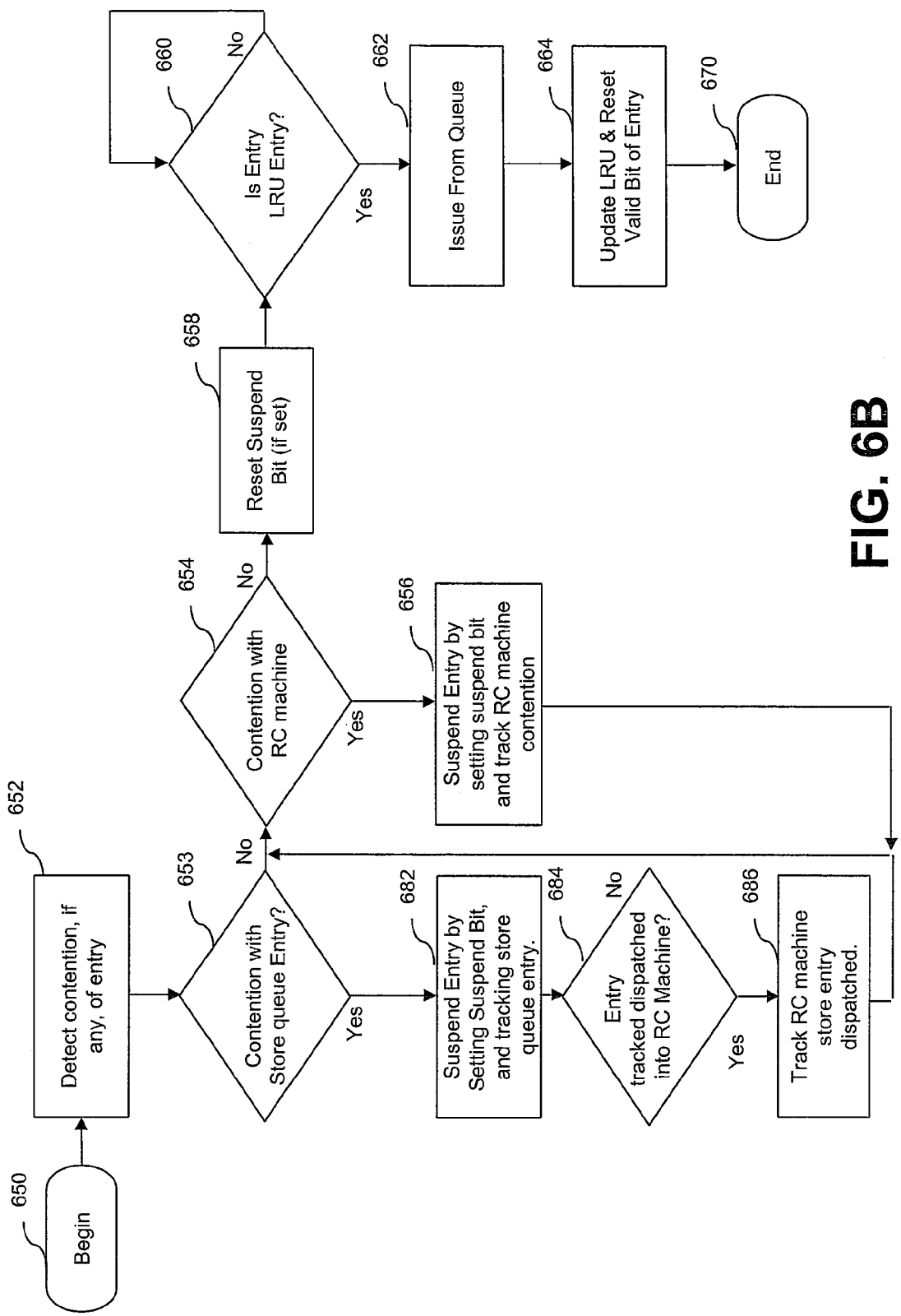
FIG. 6B is a high level logical flowchart of an exemplary process for suspending processing of a load request until such time a processor core is able to most efficiently process the load request, in accordance with one embodiment of the present invention.

Referring now to FIG. 6B, there is depicted a high level logical flowchart of an exemplary process by which CIU 316 manages issuance of load-type request from an entry 504 of a queue 402, in one embodiment. CIU 316 preferably performs the illustrated process individually for each valid entry 504 in each of queues 402a-402d.

As depicted, the process begins at block 650, for example, when the valid bit 506 of an entry 504 is set. The process then proceeds to block 652, which illustrates CIU 316 detecting whether contention exists between the request indicated in request field 510 and another memory access request of the processor core 200. At block 653 a determination is made if contention exists with a store queue entry. The detection of contention is critical to prevent the processor core from accessing requests that cannot yet be dispatched, leading to decreased processing efficiency and wasted processing cycles. When contention exists with a store queue entry, the process continues to block 682, which depicts CIU 316 suspending the request in entry 504 by setting the suspend bit 508. Additionally, the store queue entry for which the contention is detected is tracked. At block 684 a determination is made if the store entry being tracked is dispatched into an RC machine. The process loops until a determination is made that the tracked store entry has been dispatched to an RC machine. At block 686 CIU determines the RC machine that the tracked store entry was dispatched in to.

After a determination is made that a contention with a store queue entry does not exist (or no longer exists), the process continues to block 654. At block 654 a determination is made if contention exists with an RC machine. The contention may be a read claim (RC) address collision or a resource contention collision. When core interface unit 316 has determined that contention exits (block 654), the process continues to block 656, which depicts CIU 316 suspending the request in entry 504 by setting the suspend bit 508. The RC machine for which contention occurred is also tracked until the contention is resolved (block 656). In addition, the collision field may be completed to reflect the collision type. When the contention is resolved, CIU 316 may reset the suspend bit allowing processing of the request to continue to block 658.

At block 658, after a determination is made that a contention does not exist (or no longer exists), the suspend bit is reset (when the suspend bit has been set). At block 660, a determination is made whether the entry 504 is the least recently used (LRU) entry that is not suspended. In this manner, CIU 316 issues the oldest request that is available to issue. In response to a determination is made that the entry 504 is not the LRU entry that is not suspended, the process iterates at block 660. In response to a determination that the entry 504 is the LRU entry that is not suspended, CIU 316 issues the load-type request from entry 504 in accordance with a scheduling algorithm that selects between the LRU entries presented by each of queues 402 (block 462). For example, requests may be prioritized in a specific order based on the urgency of the types of requests stored in each of queues 402*a-n*. In one embodiment, requests of a translate queue (Queue 402*a*) my have first priority, followed by data-load queue (Queue 402*b*) requests, instruction-load queue (Queue 402*c*) requests, and prefetch queue (Queue 402*n*) requests. At block 664, the valid bit of the entry is reset and the LRU of queue 402*a-n* is updated. The process the ends at terminator block 670.

In the flow charts above, one or more of the methods are embodied such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. network attached storages, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent. Additionally, the present invention may be implemented in a machine in the form of a computer-readable storage medium having a plurality of instructions embodied executing on a processing device.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of data processing in a processing unit including a processor core, an upper level cache memory, and a lower level cache memory, the method comprising:

in response to receiving, from the processor core, a load-type request at a lower level cache memory, allocating an entry among a plurality of entries in a request queue of a core interface unit (CIU) in the lower level cache memory to the load-type request;

the CIU detecting contention for at least one of one or more resources between the load-type request and another memory access request in the processing unit;

in response to detecting contention for at least one of the one or more resources, the CIU suspending issuance of the load-type request from the entry of the request queue until the contention is resolved;

in response to the contention being between the load-type request and a store queue entry:

dynamically tracking processing of the store queue entry;

determining whether the store queue entry has been dispatched to a read claim (RC) machine of the lower level cache memory;

in response to determining that the store queue entry has been dispatched to an RC machine, the CIU determining the specific RC machine to which the store queue entry has been dispatched and tracking the specific RC machine; and in response to removal of the contention, terminating tracking of the specific RC machine if the contention was between the load-type request and a store queue entry and issuing the load-type request from the request queue for processing by the lower level cache memory.

2. The method of claim 1, wherein the suspending further comprises:
setting a suspend bit of the entry, wherein the suspend bit indicates that issuance of the load-type request corresponding to the entry is temporarily suspended; and
in response to removal of the contention, the CIU resetting the suspend bit.

3. The method of claim 1, further comprising:
tracking a plurality of received load-type requests in the plurality of entries in the request queue with a least recently used (LRU) mechanism; and
the CIU issuing the load request in the entry only if the load request resides in a least recently used non-suspended entry among the plurality of entries in the request queue.

4. A data processing system, comprising:
a local processor core including an upper level cache memory; and
a lower level cache memory coupled to the local processor core, wherein the lower level cache memory includes a core interface unit (CIU) including a request queue, and wherein the CIU, responsive to receiving from the local processor core a load-type request:
allocates an entry among a plurality of entries in the request queue to the load-type request;
detects contention for one or more resources between the load-type request and another memory access request of the local processor core;
in response to detecting contention for one or more resources, suspends issuance of the load-type request from the entry of the request queue until the contention is resolved;
responsive to the contention being is between the load-type request and a store queue entry:
dynamically tracks processing of the store queue entry;
determines whether the store queue entry has been dispatched to a read claim (RC) machine;
in response to determining that the store queue entry has been dispatched to an RC machine, determines the specific RC machine to which the store queue entry has been dispatched and tracks the specific RC machine; and
in response to removal of the contention, terminating tracking of the specific RC machine if the contention was between the load-type request and a store queue entry and issues the load-type request from the request queue for processing by the lower level cache memory.

5. The data processing system of claim 4, wherein the CIU sets a suspend bit of the entry to indicate that issuance of the load-type request corresponding to the entry is temporarily suspended and resets the suspend bit in response to removal of the contention.

6. The data processing system of claim 4, wherein the CIU tracks a plurality of received load-type requests in the plurality of entries in the request queue with a least recently used (LRU) mechanism and issues the load request in the entry only if the load request resides in a least recently used non-suspended entry among the plurality of entries in the request queue.

7. A computer-readable storage medium having a plurality of instructions embodied therein, wherein the plurality of instructions, when executed by a processing device, allows the processing device to:
in response to receiving, from a processor core, a load-type request at a lower level cache memory, allocate an entry among a plurality of entries in a request queue of a core interface unit (CIU) in the lower level cache memory to the load-type request;
detect contention for one or more resources between the load-type request and another memory access request in the processing unit;
in response to detecting contention for one or more resources, suspend issuance of the load-type request from the entry of the request queue until the contention is resolved; and
in response to the contention being between the load-type request and a store queue entry:
dynamically track processing of the store queue entry;
determine whether the store queue entry has been dispatched to a read claim (RC) machine of the lower level cache memory;
in response to determining that the store queue entry has been dispatched to an RC machine, determine the specific RC machine to which the store queue entry has been dispatched and track the specific RC machine;
in response to removal of the contention, terminate tracking of the specific RC machine if the contention was between the load-type request and a store queue entry and issue the load-type request from the request queue for processing by the lower level cache memory.

8. The computer-readable storage medium of claim 7, the plurality of instructions further comprising instructions that allow the processing device to:
track a plurality of received load-type requests in the plurality of entries in the request queue of the first cache slice with a least recently used (LRU) mechanism;
issue the load request in the entry only if the load request resides in a least recently used non-suspended entry among the plurality of entries in the request queue of the first cache slice.

* * * * *